United States Patent [19]

Wulf et al.

[11] Patent Number: 4,532,894
[45] Date of Patent: Aug. 6, 1985

[54] HEATING ARRANGEMENT FOR ELECTRICALLY DRIVEN VEHICLES

[75] Inventors: Helmut Wulf, Ostfildern; Friedrich Baehrle, Kernen-Rommelshausen, both of Fed. Rep. of Germany

[73] Assignee: Daimler-Benz Aktiengesellschaft, Stuttgart, Fed. Rep. of Germany

[21] Appl. No.: 595,307

[22] Filed: Mar. 30, 1984

[51] Int. Cl.³ ............................................ F02N 17/02
[52] U.S. Cl. ...................... 123/142.5 E; 123/142.5 R
[58] Field of Search ................ 123/142.5 E, 142.5 R; 180/65.2; 219/205, 206; 98/2.08

[56] References Cited

U.S. PATENT DOCUMENTS

| | | | |
|---|---|---|---|
| 2,440,369 | 4/1948 | Furman | 123/142 E |
| 4,258,676 | 3/1981 | Lamm | 123/142.5 R |
| 4,405,029 | 9/1983 | Hunt | 180/65.2 |
| 4,424,775 | 1/1984 | Mayfield | 123/142.5 R |

FOREIGN PATENT DOCUMENTS 1900483 8/1970 Fed. Rep. of Germany .
2311190 9/1974 Fed. Rep. of Germany .

Primary Examiner—Ronald H. Lazarus
Attorney, Agent, or Firm—Barnes & Thornburg

[57] ABSTRACT

A heating system for a dual-mode vehicle, such as a bus equipped with both electrical and internal combustion engine drive systems, is provided with an electrically powered heat exchanger and an auxiliary fuel heater serially connected in the engine cooling water flow line. The electric heat exchanger provides a non-polluting source of heat for the vehicle's interior within electrified portions of the drive route. The auxiliary heater supplies heat when the vehicle is standing (i.e., parked) with the engine shut off in non-electrified portions of the route. An electric water pump is also connected in series with the electric and fuel heaters. During periods of electric drive operation, the electric heater is activated when the engine cooling water temperature falls below a predetermined level even if no heat is required for the vehicle interior. The electric heater prevents the engine from cooling off and, thus, improves exhaust gas characteristics, from an environmental viewpoint, when the engine is re-started.

3 Claims, 1 Drawing Figure

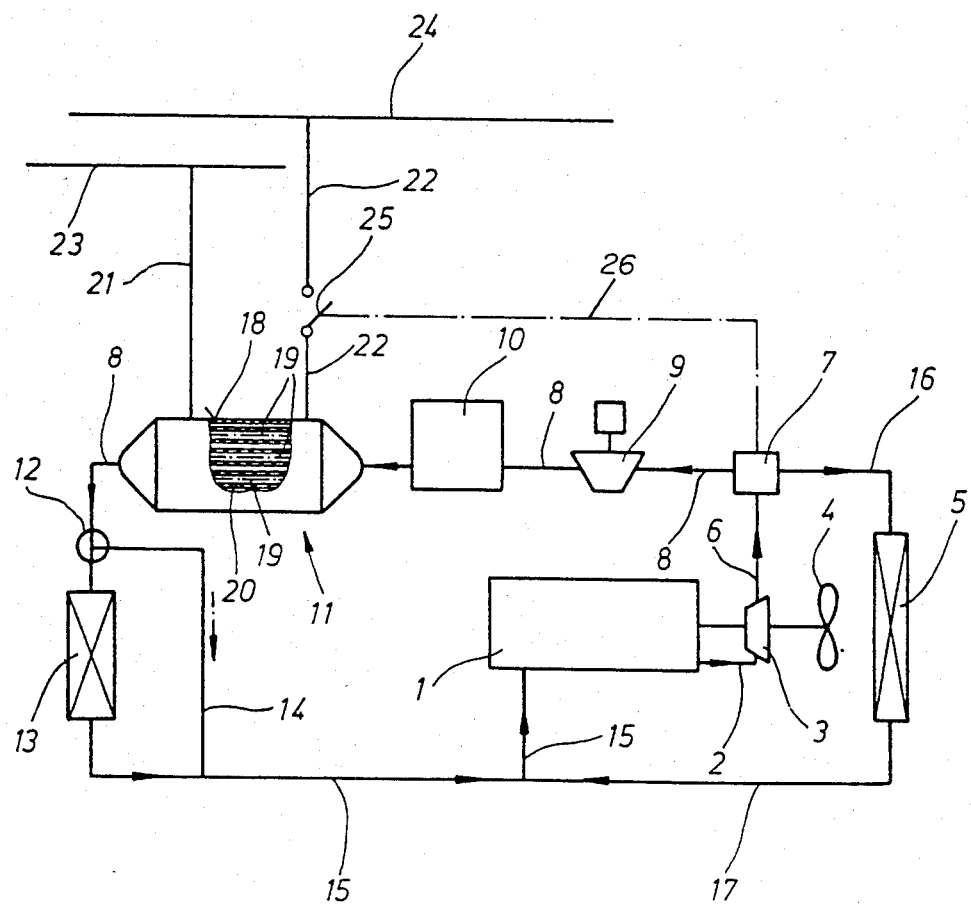

HEATING ARRANGEMENT FOR ELECTRICALLY DRIVEN VEHICLES

BACKGROUND AND SUMMARY OF THE INVENTION

This invention relates to a heating system for a dual-mode automotive vehicle, especially a bus, which is equipped to operate by means of either an electrical power source or an internal combustion engine.

Operation of such a vehicle is especially beneficial from the viewpoint of environmental protection. A known vehicle of this type, shown in German Pat. No. 2,311,190, has a heat exchanger which is constructed as a heat-storage block through which air is passed. This heat-storage block occupies a large amount of space and is very heavy. Furthermore, when the vehicle is standing (i.e., powered by neither the electrical power source, nor the internal combustion engine), the heat accumulator can be heated only by means of a cable or, alternatively, the accumulator can be taken off the vehicle and exchanged for a heated unit. This restricts the availability of the vehicle.

It is an object of this invention to increase the availability and operating radius of these vehicles, while maintaining maximal anti-pollution operating characteristics. Another object is to provide an electrically powered heat exchanger of small size and low weight which will be capable of supplying heat at the start of the operating, or heating-up cycle.

These and other objects are achieved in a heating system for a dual-mode vehicle (i.e., a vehicle which can be, powered by either electricity or an internal combustion engine) comprising an electrical heat exchanger, an auxiliary fuel heater, an electric water pump common to both electric heat exchanger and fuel heater, and control circuitry for energizing the heat exchanger when the engine cooling water temperature falls below a predetermined level. The electric heat exchanger includes a continuous-flow heater connected to receive a through-flow of cooling water from the engine. The continuous-flow heater comprises a tubular heat-exchanger having parallel connected tubes covered by vulcanized conductive sheaths which serve as heating elements. This heat-exchanger is capable of supplying a large amount of heat while occupying a relatively small space. The auxiliary fuel heater is connected in series with the continuous-flow heater and is operable only when the vehicle is not receiving power from the electrical power source. The electric water pump is connected for circulating water through both heaters and is operable at least during periods when the vehicle is standing.

Provision of the electric heat exchanger in a dual-mode vehicle ensures that the auxiliary fuel heater, which produces exhaust gases, need only be operated when the internal combustion engine is supplying power to the vehicle. Design of the heat exchanger as a continuous-flow heater which receives a through-flow of engine cooling water makes for an extremely efficient, small size-low weight apparatus which can easily be retrofitted to existing vehicle cooling systems.

Provision of the electric water pump ensures cooling water circulation through both electric and fuel heaters when the internal combustion engine is not running. Cooling of the engine, during relatively long periods of electric operation, is prevented by energizing the electric heater (even when no internal vehicle heat is demanded) to heat the cooling water. Thus, the engine exhibits a satisfactory exhaust characteristic immediately upon restarting.

Further objects, features, and advantages of the present invention will become more apparent from the following description when taken with the accompanying drawing which shows, for purposes of illustration only, an embodiment in accordance with the present invention.

BRIEF DESCRIPTION OF THE DRAWING

FIG. 1 shows a schematic representation of a dual-mode vehicle heating system according to the present invention.

DETAILED DESCRIPTION OF THE DRAWING

Referring to FIG. 1, conduit 2 leads from the cooling water jacket of internal combustion engine 1 (not illustrated in detail) to water pump 3. Fan blade 4, which forces air through radiator 5, is arranged on the exiting shaft of water pump 3. Conduit 6 connects water pump 3 to thermostatic valve 7 which, when engine 1 is cold, conducts cooling water to branch-off point 12 by way of conduit 8 which contains electrically operated water pump 9, auxiliary fuel heater 10, and electrically heated heat exchanger 11. From branch-off point 12, the cooling water is supplied, as needed, to heat exchanger 13, which is representative of several heat exchangers supplying heat to the vehicle interior, or via bypass conduit 14 to backflow conduit 15 connected to the cooling water jacket of engine 1. When engine 1 reaches its operating temperature, thermostatic valve 7 begins to open and to feed a portion of hot water, via conduit 16, to radiator 5. From there it is conducted, via backflow conduit 17, into backflow conduit 15.

In order for engine 1 to reach its operating temperature quickly, auxiliary heater 10 can be used to heat the cooling water. Auxiliary heater 10, in conjunction with water pump 9, is employed to supply hot water to heat exchanger 13 during periods of standstill (i.e., non-operation of engine 1) outside of electrified portions of the driving route. Water pump 9 can be powered during these periods by, for example, an on-board electrical storage battery.

Through the use of appropriate circuitry (not shown) auxiliary heater 10 is prevented from operating during periods of standstill and driving within an electrified driving route. Instead, electrically heated heat exchanger 11 is used if necessary. Heat exchanger 11 is designed as a continuous-flow heater 18 with parallel-connected tubes 19. Tubes 19 are provided with sheaths of vulcanized-on heat conductors 20 which are connected, via lines 21 and 22, to trolley wires 23 and 24. The supply of current is turned on and off by switch 25 symbolically inserted in line 22. As indicated by dot-dash line 26, switch 25 can also be operated by thermostatic valve 7. Switch 25 is closed, and heating of the cooling water effected if, during electric operation, the temperature of the cooling water drops to a predetermined value. Thus, it is insured that even if heat exchanger 13 is not called upon to supply heat to the vehicle interior (i.e., the vehicle heater is off), engine 1 is maintained at operating temperature to improve the characteristics of the exhaust gas immediately after start-up.

Electrically operated water pump 9 is turned on automatically if the cooling water speed reaches a predetermined lower limit value, with auxiliary heater 10 or heat exchanger 11 being activated.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. In a dual-mode vehicle equipped to be powered by either an electrical power source or a water cooled internal combustion engine, the improvement comprising a heating system having:

electrical heat exchanger means powered by said electrical power source, said heat exchanger means including a continuous-flow heater connected to receive a through-flow of cooling water from said internal combustion engine;

an auxiliary fuel powered heater operable only when said vehicle is not powered by said electrical power source, said fuel powered heater being connected in series with said continuous-flow heater to receive said flow of cooling water;

electric water pump means for circulating said flow of cooling water through said continuous flow heater and said fuel powered heater, said water pump means being operable at least during standing periods when said vehicle is not receiving power from said electrical power source and said internal combustion engine is not running; and control means for energizing said continuous-flow heater when a cooling water temperature of said internal combustion engine reaches a pre-determined value.

2. The improvement according to claim 1, wherein said pre-determined value is below an operating temperature of said internal combustion engine.

3. The improvement according to claim 1, wherein said continuous-flow heater comprises a tubular heat exchanger having parallel connected tubes, said tubes being provided with vulcanized conductive sheaths.

* * * * *